(12) United States Patent
Baumann et al.

(10) Patent No.: US 8,301,336 B2
(45) Date of Patent: Oct. 30, 2012

(54) METHOD AND APPARATUS FOR WARNING FOLLOWING VEHICLES OF FRONTALLY ESCALATING LONGITUDINAL TRAFFIC

(75) Inventors: Karl-Heinz Baumann, Bondorf (DE); Michael Fehring, Neuhausen (DE); Rainer Justen, Altdorf (DE)

(73) Assignee: Daimler AG, Stuttgart (DE)

( * ) Notice: Subject to any disclaimer, the term of this patent is extended or adjusted under 35 U.S.C. 154(b) by 187 days.

(21) Appl. No.: 12/680,080

(22) PCT Filed: Sep. 3, 2008

(86) PCT No.: PCT/EP2008/007173
§ 371 (c)(1),
(2), (4) Date: May 20, 2010

(87) PCT Pub. No.: WO2009/043418
PCT Pub. Date: Apr. 9, 2009

(65) Prior Publication Data
US 2010/0241311 A1    Sep. 23, 2010

(30) Foreign Application Priority Data
Sep. 26, 2007   (DE) .................... 10 2007 045 960

(51) Int. Cl.
*B60R 21/00* (2006.01)
*G08G 1/16* (2006.01)
(52) U.S. Cl. .......................... 701/36; 701/301
(58) Field of Classification Search .......... 701/36, 701/96, 301
See application file for complete search history.

(56) References Cited

U.S. PATENT DOCUMENTS

| | | | |
|---|---|---|---|
| 5,091,726 A * | 2/1992 | Shyu | 701/96 |
| 6,114,951 A * | 9/2000 | Kinoshita et al. | 340/436 |
| 6,278,360 B1 * | 8/2001 | Yanagi | 340/436 |
| 7,774,137 B2 * | 8/2010 | Thorne | 701/301 |
| 2004/0049343 A1 | 3/2004 | Yamadaji et al. | |
| 2006/0164221 A1 * | 7/2006 | Jensen | 340/435 |
| 2008/0125949 A1 * | 5/2008 | Richter | 701/96 |

FOREIGN PATENT DOCUMENTS

| | | |
|---|---|---|
| DE | 3431898 A1 * | 3/1986 |
| DE | 199 33 782 A1 | 1/2001 |
| DE | 10 2004 062 497 A1 | 7/2006 |
| DE | 10 2005 050 720 A1 | 5/2007 |
| EP | 1873737 A1 * | 1/2008 |

(Continued)

OTHER PUBLICATIONS

EPO machine translation of DE 102005050720.*

(Continued)

*Primary Examiner* — James Trammell
*Assistant Examiner* — David Testardi
(74) *Attorney, Agent, or Firm* — Crowell & Moring LLP

(57) ABSTRACT

A method and a device for warning following vehicles in a group of several sequential vehicles, including at least a leading vehicle, a middle vehicle and a following vehicle, wherein a warning is transmitted from the middle vehicle to the following vehicle. A total distance and a total relative speed between the leading vehicle and the following vehicle are calculated based on measurements made by the middle vehicle. The total distance and total relative speed are used to determine whether a critical approach of the following vehicle to the leading vehicle is occurring, and if so, an automatic warning is transmitted from the middle vehicle to the following vehicle.

12 Claims, 1 Drawing Sheet

FOREIGN PATENT DOCUMENTS

| | | | | |
|---|---|---|---|---|
| GB | 2222710 | A | * | 3/1990 |
| JP | 10181487 | A | * | 7/1998 |
| JP | 11042991 | A | * | 2/1999 |
| JP | 2002154347 | A | * | 5/2002 |
| JP | 2002347511 | A | * | 12/2002 |
| JP | 2005145385 | A | * | 6/2005 |

OTHER PUBLICATIONS

International Search Report including partial translation dated Dec. 17, 2008 and PCT/ISA/237 (Thirteen (13) pages).

German Office Action dated May 21, 2008 (Four (4) pages).

* cited by examiner

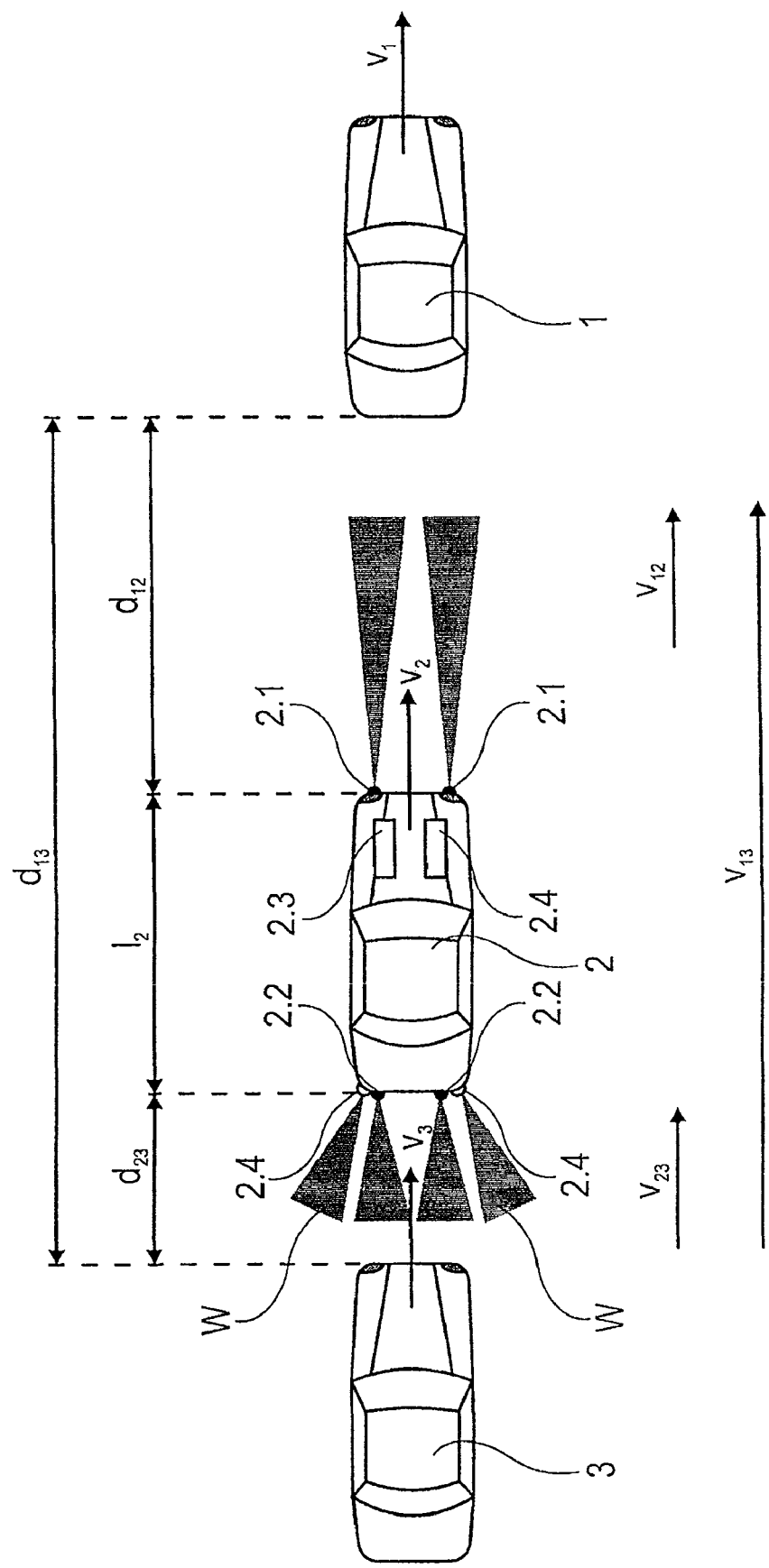

METHOD AND APPARATUS FOR WARNING FOLLOWING VEHICLES OF FRONTALLY ESCALATING LONGITUDINAL TRAFFIC

BACKGROUND AND SUMMARY OF THE INVENTION

This application is a national stage of PCT International Application No. PCT/EP2008/007173, filed Sep. 3, 2008, which claims priority under 35 U.S.C. §119 to German Patent Application No. 10 2007 045 960.4, filed Sep. 26, 2007, the entire disclosure of which is herein expressly incorporated by reference.

The present invention relates to a method and apparatus for warning following vehicles in a group of several sequential vehicles, wherein a warning is transmitted from a leading vehicle to a following vehicle.

German patent document DE 10 2004 062 497 A1 discloses a method for reducing the danger of a collision with the rear end of a first vehicle by a following second vehicle. A distance and a relative speed of the following second vehicle to the first vehicle are thereby determined. By means of the distance and the relative speed it is determined if a collision of the second vehicle with the rear end of the first vehicle is imminent, if so, a warning is transmitted from the first vehicle to the following vehicle second vehicle and/or actions are triggered in the first vehicle.

German patent document DE 199 33 782 A1 describes a device for avoiding rear end collisions by the observation of the rear traffic space, where a sensor for measuring the relative speed and the distance between a first and a second vehicle is provided at a first motor vehicle, whose sensor signals are delivered to a computer. The computer controls a device in the first motor vehicle, by means of which a collision-avoiding or collision-reducing action can be carried out.

One object of the present invention is to provide an improved method and apparatus for warning following vehicles in a group of several sequential vehicles.

This and other objects and advantages are achieved by the method and apparatus according to the invention, in which a vehicle (referred to herein as a "middle vehicle") traveling in a group of sequential vehicles transmits a warning to a "following vehicle" following behind it, if a critical approach of the following vehicle to a "leading vehicle" (traveling ahead of the middle vehicle) is occurring. The critical approach is determined by a control unit of the middle vehicle from a total distance and a total relative speed between the leading vehicle in front of the middle vehicle and the following vehicle, wherein the middle vehicle comprises at least one distance and/or relative speed sensor directed to the front and at least one distance and/or relative speed sensor directed to the rear for determining the relative speed and the relative distance.

By means of the early warning, the following vehicle has a higher reaction time and a longer brake path available, which leads to a reduction of a danger or a severity of a possible collision of the following vehicle with the middle vehicle.

In addition to the occurrence of the critical approach of the following vehicle to the middle vehicle as a criterion for automatically warning the following vehicle, a warning can also be carried out when an imminent front collision of the middle vehicle with the leading vehicle occurs simultaneously with a critical approach of the following vehicle to the middle vehicle. In this manner, a further increase of the reaction time and an extension of the available brake path can be created for the following vehicle, as an earlier warning can be issued.

A rear distance and a rear relative speed between the following vehicle and the middle vehicle are further determined. By means of the front and the rear relative speed, the front and the rear distance and a vehicle length of the middle vehicle, it is possible to determine the total relative speed and the total distance. It is further determined if a collision of the middle vehicle with the leading vehicle is imminent, and if a collision of the rear vehicle with the middle and/or leading vehicle is imminent.

If a front and/or rear end collision of the middle vehicle is imminent, an optical and/or acoustic warning is issued from the middle vehicle to the following vehicle on the one hand. One or several brake lights of the middle vehicle can thereby be switched on automatically as an optical warning and/or switched brighter or in a flashing manner and/or a hazard warning flasher is switched on. A horn of the middle vehicle can for example be actuated automatically as an acoustic warning. An early warning is thereby available to the driver of the following vehicle, by means of which he can initiate an early delay of his vehicle, so as to prevent a possible collision or to diminish its strength.

On the other hand, a measure for the protection of the occupants of the middle vehicle (e.g., a pretensioning of a safety belt, an activation of active headrests or a deployment of a roll-over bar) is triggered with an imminent frontal or rear end collision of the middle vehicle. An early protection of the occupants of the vehicle is achieved thereby, and the occupants are in such a position during a collision that further restraint systems can act optimally on the occupants.

Further, a brake torque of the middle vehicle is increased during an imminent frontal and/or rear end collision during and/or shortly after the collision. By this increase, a maximum delay of the middle vehicle can be achieved quickly, and the severity of the collision with the leading vehicle is reduced or the collision is prevented.

Other objects, advantages and novel features of the present invention will become apparent from the following detailed description of the invention when considered in conjunction with the accompanying drawings.

BRIEF DESCRIPTION OF THE DRAWINGS

The single FIGURE illustrates schematically a situation with an imminent front and/or rear end collision of the middle vehicle.

DETAILED DESCRIPTION OF THE DRAWINGS

Referring to the FIGURE, a leading vehicle 1, a middle vehicle 2 and a following vehicle 3 are moving, for example on a road. The leading vehicle 1 moves with a speed $v_1$ at a front distance $d_{12}$ from the middle vehicle 2. In this example, the speed $v_1$ of the leading vehicle 1 is significantly lower than the speed $v_2$ of the middle vehicle 2. A following vehicle 3 with approximately the same speed $v_3$ as the speed $v_2$ of the middle vehicle drives behind the middle vehicle 2, but with a lower rear distance $d_{23}$.

If the situation develops further with unchanged distances $d_{12}$, $d_{13}$ and associated relative speeds $v_{12}$, $v_{23}$, the middle vehicle would impact the leading vehicle 1. Due to the lower rear distance $d_{23}$, the following vehicle would thereupon impact the middle vehicle 2.

The middle vehicle 2 is equipped with one or more distance and relative speed sensors 2.1 directed to the front, and one or more distance and relative speed sensors 2.2 directed to the rear, which are connected to one or several warning devices 2.4 via a control unit 2.3. The warning device 2.4 is designed as an acoustic and/or optical device, for example a horn, a hazard warning flasher and/or a brake light. The control unit 2.3 is provided for implementing the method according to the invention.

The control unit 2.3 automatically and continuously senses the front distance $d_{12}$, the front relative speed $v_{12}$ between the middle vehicle 2 and the leading vehicle 1, the rear distance $d_{23}$, and the rear relative speed $v_{23}$ between the middle vehicle 2 and the following vehicle 3. The control unit 2.3 determines a total relative speed $v_{13}$ and a total distance $d_{13}$ between the leading vehicle 1 and the following vehicle 3 from the relative speeds $v_{12}$, $v_{23}$, the distances $d_{12}$, $d_{13}$ and a vehicle length $l_2$ of the middle vehicle 2 according to:

$$v_{13}=v_{12}+v_{23} \quad [1]$$

$$d_{13}=d_{12}+d_{23}+l_2 \quad [2]$$

A remaining time $t_K$ until the occurrence of a collision between the following vehicle 3 and the leading vehicle 1 is calculated according to:

$$t_K=d_{13}/v_{13} \quad [3]$$

The control unit 2.3 of the middle vehicle 2 determines by means of the total relative speed $v_{13}$ and the total relative distance $d_{13}$ if a critical approach of the following vehicle 3 to the leading vehicle 1 occurs. A critical approach occurs if the remaining time $t_K$ until the occurrence of the collision is the same as or less than a necessary time $t_W$ for warning the following vehicle 3:

$$t_K \leqq t_W, \quad [4]$$

wherein the necessary time $t_W$ for the warning (=warning threshold) is given in a fixed manner or is determined according to:

$$t_W=t_A+t_R. \quad [5]$$

A reaction time $t_R$ and an action time $t_A$ are thereby given statically or result dynamically in dependence on the speeds $v_1$, $v_2$, $v_3$ or the relative speeds $v_{12}$, $v_{13}$ or the total relative speed $v_{13}$.

If the control unit 2.3 of the middle vehicle identifies a critical approach of the following vehicle 3 to the leading vehicle 1, the control unit 2.3 automatically accesses one or more warning devices 2.4 independently of the behavior of the middle vehicle 2, and thus generates an optical and/or acoustic warning as a warning W, which is transmitted to the following vehicle 3.

Thus, a hazard warning flasher and/or one or several brake lights of the middle vehicle 2 are activated for an optical warning. Lights directed towards the rear, especially the brake lights of the middle vehicle 2 can thereby be controlled in such a manner that these glow brighter and/or in a flashing manner. A flashing optical warning can also be perceived well with lacking concentration or from the corner of the eye of a driver. A horn of the middle vehicle 2 is automatically activated as an acoustic warning. The advantage of an acoustic warning is that it can be perceived without direct eye contact.

By means of the warning, the possibly distracted driver of the following vehicle 3 will be alerted to an imminent accident situation and can for example react by a strong braking of the following vehicle 3 and prevent the accident or at least reduce its severity by reducing its kinetic energy.

In a further embodiment of the invention, an imminent collision of the middle vehicle 2 with the leading vehicle 1 is used as reason for triggering the warning W in addition to the critical approach of the following vehicle 3 to the middle vehicle 2. An imminent collision of the following vehicle 3 with the middle vehicle driving immediately in front can also be used as a reason for triggering the warning W. Whether a frontal and/or rear end collision is imminent is respectively determined from the distances $d_{12}$, $d_{13}$ and the associated relative speeds $v_{12}$, $v_{13}$.

In addition to triggering the warning W to the driver of the following vehicle 3, the control unit 2.3 of the middle vehicle accesses one or more devices (not shown) which increase the safety of the vehicle occupants, such as restraint systems, which e.g., perform a pretensioning of a safety belt, an actuation of active headrests or a deployment of a roll-over bar. An early protection of the occupants of the vehicle is thus enabled, and the occupants are in such a position during a collision that further restraint systems, for example one or more air bags can have an optimal effect on the occupants.

On the other hand, the control unit 2.3 controls a device for adjusting a brake torque of the middle vehicle 2. This device increases the brake torque of the middle vehicle 2 prior to, during and/or shortly after the collision. A maximum delay of the middle vehicle can be achieved quickly by means of this increase, and the severity of the collision with the leading vehicle is decreased or the collision is completely prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for warning a vehicle in a group of vehicles which are traveling one behind another, including at least a leading vehicle, a middle vehicle and a following vehicle, said method comprising:
   calculating, by a control unit of the middle vehicle, a total distance and a total relative speed between the leading vehicle and the following vehicle, based on relative speed and distance information determined by the control unit of the middle vehicle;
   determining, by the control unit of the middle vehicle, whether a critical approach of the following vehicle to the leading vehicle is occurring based on said total distance and total relative speed; and
   when a critical approach is occurring, transmitting an automatic warning from the middle vehicle to the following vehicle.

2. The method according to claim 1, therein:
   in addition to said critical approach, it is determined from a front distance and a front relative speed between the leading vehicle and the middle vehicle, whether a frontal collision of the middle vehicle with the leading vehicle is imminent; and
   when said critical approach is occurring at the same time when an imminent frontal collision exists, a warning is transmitted from the middle vehicle to the following vehicle.

3. The method according to claim 1, wherein:
   in addition to said critical approach, it is determined from a rear distance and a rear relative speed between the following vehicle and the middle vehicle whether a rear end collision of the following vehicle with the middle vehicle is imminent; and
   when said critical approach is occurring at the same time when an imminent rear end collision is identified, a warning is transmitted from the middle vehicle to the following vehicle.

4. The method according to claim 3, wherein the total distance is determined from a front distance between the leading vehicle and the middle vehicle, the rear distance and a vehicle length of the middle vehicle; and the total relative speed is determined from a front relative speed between the leading vehicle and the middle vehicle and the rear relative speed.

5. The method according to claim 1, wherein said warning comprises one of an optical warning and an acoustic warning.

6. The method according to claim 5, wherein said optical warning comprises at least one of i) a brake light of the middle vehicle is automatically switched on, made brighter, or operated in a flashing manner; and ii) a hazard warning flasher of the middle vehicle is automatically switched on.

7. The method according to claim 5, wherein a horn of the middle vehicle is actuated as the acoustic warning.

8. The method according to claim 1, wherein, if one of a frontal collision between the middle vehicle and the leading vehicle and a rear end collision between the middle vehicle and the following vehicle is imminent, a measure is triggered for protecting the occupants of the middle vehicle.

9. The method according to claim 1, wherein if one of a frontal collision between the middle vehicle and the leading vehicle and a rear end collision between the middle vehicle and the following vehicle is imminent, a brake torque of the middle vehicle is increased prior to, during or shortly after the collision.

10. A middle vehicle, comprising:

a control unit configured to warn a vehicle in a group of vehicles which are traveling one behind another, including at least a leading vehicle, the middle vehicle and a following vehicle, said control unit configured to calculate a total distance and a total relative speed between the leading vehicle and the following vehicle, based on relative speed and distance information determined by the control unit of the middle vehicle;

determine whether a critical approach of the following vehicle to the leading vehicle is occurring based on said total distance and total relative speed; and when a critical approach is occurring, transmit an automatic warning from the middle vehicle to the following vehicle; and at least one sensor directed to the front of the middle vehicle that senses a front distance and front relative speed between the middle vehicle and the leading vehicle, and at least one sensor directed to the rear of the middle vehicle that senses a rear distance and rear relative speed between the middle vehicle and the following vehicle.

11. The device according to claim 10, wherein:

the control unit automatically actuates a warning device of the middle vehicle when said critical approach is occurring.

12. The device according to claim 11, wherein the warning device comprises at least one of an optical device and an acoustic device.

* * * * *